June 6, 1939.  S. GOLDSTEIN  2,161,346
MACHINE FOR CUTTING FUR TRIMMINGS FOR OVERSHOES, SLIPPERS, AND THE LIKE
Filed Oct. 29, 1936
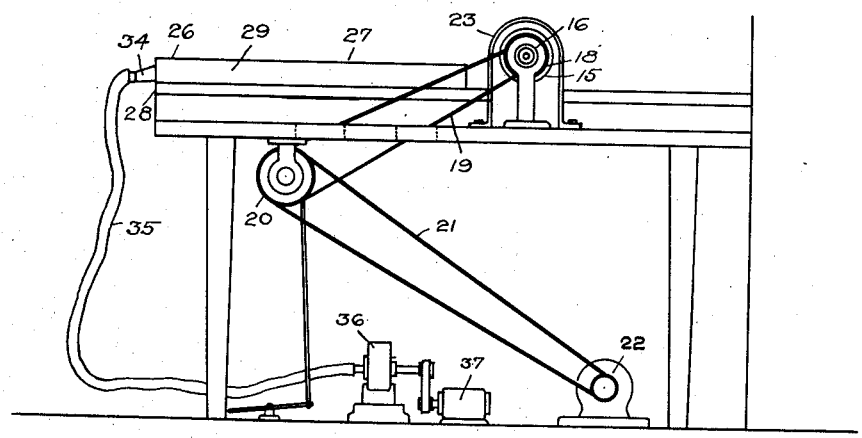
FIG. 1.
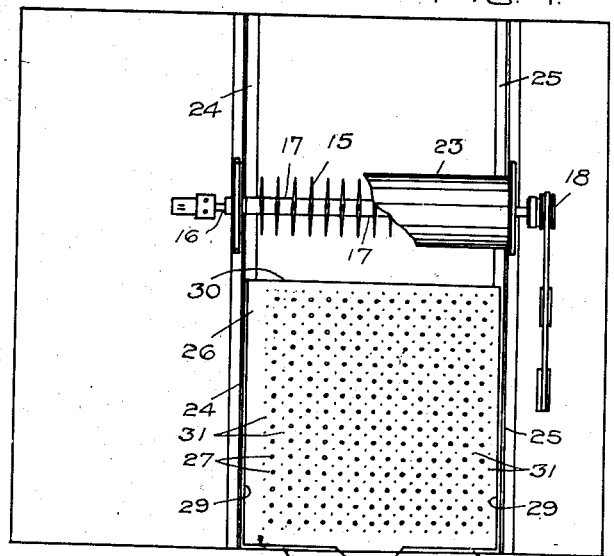
FIG. 2.
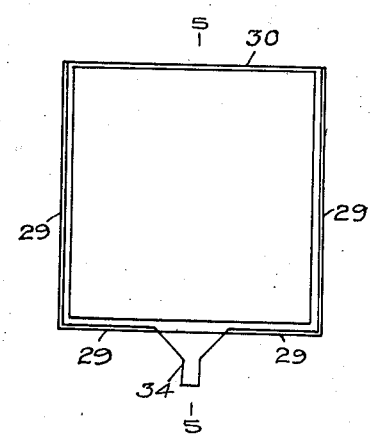
FIG. 3.
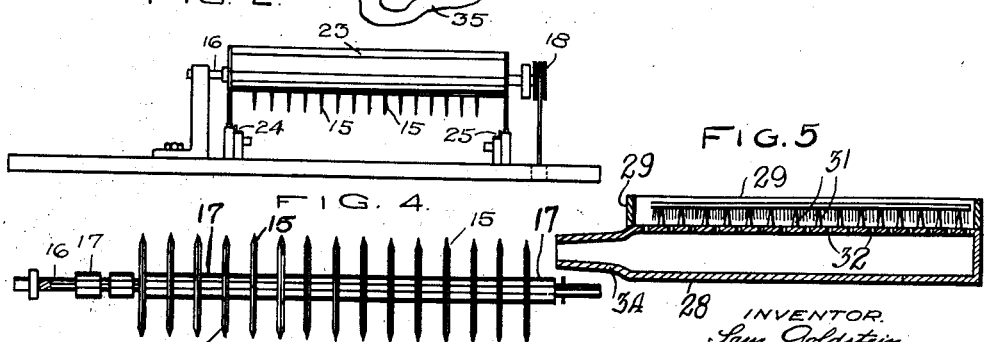
INVENTOR.
Sam Goldstein.
BY E. J. Featherstonhaugh.
ATTORNEY.

Patented June 6, 1939

2,161,346

UNITED STATES PATENT OFFICE 2,161,346

MACHINE FOR CUTTING FUR TRIMMINGS FOR OVERSHOES, SLIPPERS, AND THE LIKE

Sam Goldstein, Montreal, Quebec, Canada

Application October 29, 1936, Serial No. 108,133

1 Claim. (Cl. 164—61)

The invention relates to a machine for cutting fur trimmings for overshoes, slippers and the like, as described in the present specification and illustrated in the accompanying drawing that forms part of the same.

The invention consists essentially in the novel means employed for cutting and feeding whereby the hair of the fur is in no way interfered with or even crushed as pointed out in the claim for novelty following a description in detail of the parts of the machine and the particular construction of the feed carriage.

The objects of the invention are to save the hair of the fur commonly used in producing strips of fur used largely in footwear and in many other forms of trimming for various purposes; to simplify the manufacture of this product and in fact bringing such trimmings into the mass product class of manufacturing, the common term for such being the mass production; to insure similarity in these trimmings and thereby very much improve the overshoes and so embellish and unify the class of goods, and generally to introduce in the fur trade a machine that will be applicable in a great many directions as well as economical to run.

In the drawing,

Figure 1 is an elevational view of the machine mounted on a table especially prepared for the purpose.

Figure 2 is a plan view of the table with the feed carriage mounted in front of the cutters ready for the cutting movement.

Figure 3 is a plan view of the feed carriage.

Figure 4 is an end elevational view of the cutter ready to receive the carriage.

Figure 5 is a sectional view showing the fur stretched in the feed carriage ready for cutting.

Figure 6 is an enlarged view of the cutter.

Like numerals of reference indicate corresponding parts in the various figures.

Referring to the drawing, the cutter is of regulation form, each cutter being a circular disc sharpened at the edge and mounted on a shaft in relation to many other cutters of exactly the same form. These cutters are indicated by the numeral 15, and the shaft by the numeral 16, and the cutters are slidable on the shaft, and separated one from the other by the spacing rings 17.

At one end of the shaft the pulley 18 is operated by the belt 19 from the counter pulley 20, and this counter pulley is operated by the belt 21 from the motor 22, and the hood 23 closes in the otherwise dangerously exposed edges of the knives or blades.

The tracks 24 and 25 extend along the table under the machine and therebeyond to the end of the table, and the carriage 26 slides on said tracks. The carriage 26 is formed like a box, having the top 27, the bottom 28, and the walls 29, said walls extending above the top 27, except at the inner end 30, that is the end nearest to the cutters 15. The top of the carriage is studded with pins 31, and is also perforated as shown at 32. The opening 33 in the front of the carriage has the pipe 34 connected through a rubber connection 35 to a fan 36, this fan being operated by the motor 37. This blower system is turned on whenever the machine is operated.

The feeding is entirely done by sliding the carriage on the tracks and when the skin is located in the carriage over the pins 31, there is no danger of any faults in the cutting made, especially so as the suction from the fan 36 through the perforated holes 32 keeps the hairs of the skin straight down during the operation, thus making the cutting easier, for the hair is quite free projecting from the skin, and therefore out of the way of all of the knives entirely.

What I claim is:

In a machine for cutting fur, a table having tracks attached thereto, a series of cutters, a carriage sliding to and fro under said cutters and formed of a base board, a top board and connecting walls, pins at said top board adapted to support the skin of the fur in immediate engagement with the cutters and perforations in the top board to allow for the suction of the hair from the skin away from the cutters.

SAM GOLDSTEIN.